United States Patent [19]

Ogawa et al.

[11] Patent Number: 4,788,168

[45] Date of Patent: Nov. 29, 1988

[54] METHOD FOR PRODUCING CARBON-CERAMIC COMPOSITE MATERIAL

[75] Inventors: Ichitaro Ogawa; Hisayoshi Yoshida; Kazuo Kobayashi, all of Tosu, Japan

[73] Assignee: Agency of Industrial Science and Technology, Tokyo, Japan

[21] Appl. No.: 876,426

[22] Filed: Jun. 20, 1986

[30] Foreign Application Priority Data

Jun. 27, 1985 [JP] Japan .................................. 60-142348

[51] Int. Cl.⁴ ............................................... C04B 35/52
[52] U.S. Cl. ......................................... 501/99; 501/87; 501/90; 501/96; 501/97; 264/65; 264/66
[58] Field of Search ...................... 264/65, 66; 501/87, 501/90, 96, 97, 99

[56] References Cited

U.S. PATENT DOCUMENTS

| | | | |
|---|---|---|---|
| 2,201,366 | 8/1939 | Grodsky | 501/99 |
| 2,471,016 | 5/1949 | Westmoreland-White | 501/87 |
| 4,514,346 | 4/1985 | Luhleich et al. | 501/90 |
| 4,518,702 | 5/1985 | Yoshida et al. | 501/90 |

*Primary Examiner*—William R. Dixon, Jr.
*Assistant Examiner*—David M. Brunsman
*Attorney, Agent, or Firm*—Oblon, Fisher, Spivak, McClelland & Maier

[57] ABSTRACT

Described herein is a method for producing a carbon-ceramic composite material, which is characterized by firing a ground powder mixture of low temperature coke and a ceramic material in a non-oxidizing atmosphere at a temperature higher than 800° C., inclusive, and lower than an inceptive sintering temperature of the ceramic material, prior to shaping and sintering stages.

10 Claims, No Drawings

METHOD FOR PRODUCING CARBON-CERAMIC COMPOSITE MATERIAL

BACKGROUND OF THE INVENTION

1. Field of the Invention:

This invention relates to a method for producing a carbon-ceramic composite material of high density and strength by a facilitated process which can be carried out under normal pressure.

Carbon-ceramic composite materials have wide applications as various high temperature materials, mechanical parts materials, ceramic materials, materials for use in chemical industries or electric or electronic materials. This invention particularly concerns a novel technology for producing a carbon-ceramic composite material, which permits automation of the manufacturing process and a continuous operation, realizing a considerable reduction of the production cost while facilitating production of articles of complicate shapes.

2. Prior Art:

Carbon-ceramic composite materials are novel materials which possess the versatile properties of ceramic materials along with excellent high temperature properties, electric conductivity, corrosion resistance and abrasion resistance which are characteristic of carbonaceous materials. Many attemps have thus far been devoted to the development of carbon-ceramic composite materials in various countries. However, it has been difficult to obtain a product of high density by the conventional methods using a pitch binder, which can be a cause of porousness, or by the conventional hot press methods, in addition to the problems such as high production cost and difficulty of producing large structures of different shapes, barring wide application of the carbon-ceramic composite materials.

In our prior patent applications (Japanese Patent Publication No. 58-38386, Laid-Open Japanese Patent Application Nos. 59-131576, 59-213674 and 60-60299), the present inventors proposed novel techniques for obtaining carbon-ceramic composite materials by mixing finely ground powder of low-temperature coke having a residual volatile content greater than 4% with ceramic powder, followed by compression molding and sintering. These methods permit sintering under normal pressure and unnecessitate a binder, so that products of high density and strength can be obtained at a significantly reduced cost as compared with the conventional hot press processes. These advantages are receiving a keen attention in various industrial fields, arousing new expectaions for carbon-ceramic composite materials.

In the inventors' prior methods mentioned above, it is invariably necessary to apply pressure when molding the raw powder mixture, more specifically, to apply a large pressure of at least 1500 kg/cm$^2$ or higher and, in order to obtain a product of high density, to apply normally a pressure as high as 2000 kg/cm$^2$. Besides, the pressure has to be applied uniformly over a long time period to prevent cracking of the products after molding or during the sintering process. Of course, this is unsuitable for continuous operations, and invites a considerable increase in the production cost. In addition, the molding method which necessitates application of a high pressure has a difficulty in forming structures of complicate shapes, particularly, rod-like elongated structures. In order to eliminate these problems or drawbacks, it is necessary to resort to injection molding, extrusion molding or other powder molding which does not need application of a high pressure and which is suitable for continuous operation.

SUMMARY OF THE INVENTION

It is an object of the present invention to provide a novel method for producing a carbon-ceramic composite of high density and strength in a facilitated manner without needing to apply a high pressure in a shaping or molding stage prior to sintering.

The present inventors have found that it is possible to obtain sinters of satisfactory quality even from moldings which are shaped under normal pressure, by preliminary heating a mixture of finely ground powder mixture of low-temperature coke and a ceramic material in a non-oxidizing atmosphere at a temperature higher than 800° C., inclusive, and lower than an inceptive sintering temperature of the ceramic powder. If the preliminary heating temperature is lower than 800° C., the ultimate sintered body will become porous unless molded under high pressure. On the other hand, if the preliminary heating temperature is higher than the inceptive sintering temperature of ceramics (e.g., 1700° C. for SiC), the particles of the powder mixture will undergo sintering and cohesion to a marked degree, giving an adverse effect on densification of the product in the subsequent shaping or sintering stage.

In accordance with the present invention, there is provided a method for producing a carbon-ceramic composite material, which consists preliminarily heating, prior to shaping, a ground powder mixture of low-temperature coke and a ceramic material in a non-oxidizing atmosphere at a temperature higher than 800° C. and lower than an inceptive sintering temperature of the ceramic material, followed by shaping or molding under normal pressure and sintering. Features of the invention reside in that the grade of sintering is improved by heating the ground powder mixture prior to shaping, as a result permitting to shape the powder mixture by a molding method which is advantageous from the standpoint of the manufacturing process, namely, by an injection molding, extrusion molding or ordinary molding method which does not require application of a high pressure, and to manufacture products of complicate shapes.

PARTICULAR DESCRIPTION OF THE INVENTION

According to the invention, the carbon-ceramic composite material may incorporate a diversity of ceramic materials including carbides, borides, nitrides and oxides. These ceramic materials can be used singly or in combination. The content of the ceramic material in the ground powder mixture should be in the range of 10-90%. With a ceramic content in a lower range of 10-20%, the material undergoes contraction in a lesser degree in the heating state. In this case, the powder mixture can be shaped into a dense body by applying a low pressure of about 200 kg/cm$^2$ in the shaping stage to obtain a product of high density. A body of a higher density can be shaped by adding a small amount of a binder or lubricant to the powder.

Metal borides and boron carbide have an effect of accelerating sintering of carbon and many ceramics. Therefore, addition of these compounds to the ground powder mixture will accelerate densification of the composite material in the sintering stage, and accordingly it will become possible to lower than sintering temperature.

For preparation of the ground powder mixture, there may be employed a vibrating ball mill, mortar machine, attriter, roulette mill or the like. An ordinary ball mill can be used in a case where a treatment of a long time length is given. However, single impulsive comminution like a jet mill is unsuitable.

Hereafter, the invention is illustrated more particularly by the following example.

EXAMPLE

Low-temperature coke with 12% of a residual volatile content was pulverized by a vibrating ball mill for 1 hour, and, after adding thereto in percentage by volume 25% of SiC powder and 5% of $B_4C$ powder, further ground by a mortar machine for 5 hours. The resulting ground powder mixture was heated at 1000° C. for 1 hour, in an atmosphere of argon gas and with a heating rate of 5° C./min. The heated powder was ground in a mortar machine for a short time period (15 minutes) to disintegrate coherent particles, and then added with 1% of starch, serving as a binder, and water to form a slurry. The powdery slurry was shaped into a rectangular body of about $1 \times 1 \times 4$ (cm) by means of a bamboo spatula without resorting to any pressurizing means. The rectangular body was left to stand for one day for drying, and sintered in a Tamman electric furnace at 2200° C. for 1 hour in argon gas Stream and with a heating rate of 10° C./min. Various physical properties of the composite material thus obtained are shown in the table below, which are almost equivalent to the physical properties of the carbon-ceramic composite material by the afore-mentioned method (Japanese Patent Publication No. 58-38386) using compression molding. In case of a composite material shaped by compression molding as in the just-mentioned prior method, carbon forms a continuous phase when low-temperature coke is mixed in a large proportion in the starting powder mixture. On the other hand, according to the method of the present invention, a composite material with a continuous phase of ceramics can be obtained even when low-temperature coke is mixed in a large proportion. Therefore, it is expected that the composite materials obtained by the method of the present invention will manifest novel electric, thermal and chemical properties which are diffierent from those of the conventional counterparts.

| Linear Contraction by Sintering | High Density | Shore Hardness | Bending Strength |
| --- | --- | --- | --- |
| 16.9% | 2.10 g/cm$^3$ | 46 | 1700 kg/cm$^2$ |

As described hereinbefore, the method of the present invention permits to produce carbon-ceramic composite materials with a sufficient strength suitable for various applications by injection molding, extrusion molding or ordinary molding of a starting ground powder mixture, instead of the conventional compression molding, by pre-heating the ground powder mixture in a non-oxidizing atmosphere at a temperature higher than 800° C. Accordingly, it becomes possible to produce articles of complicate shapes which have been difficult to obtain by the conventional methods or to produce articles of a given shape with higher efficiency.

What is claimed is:

1. A method for producing a high density high strength sintered carbon-ceramic composite material, consisting essentially of:
    a. heating a ground powder mixture consisting essentially of low-temperature coke and a ceramic material in a non-oxidizing atmosphere at a temperature higher than 800° C., inclusive, and lower than an inceptive sintering temperature of said ceramic material, and then
    b. molding the powder mixture to shape and sintering.

2. The method of claim 1, wherein said composite material is composed of low-temperature coke and at least one ceramic material selected from the group consisting of carbides, borides, nitrides and oxides.

3. The method of claim 1, wherein the proportion of said ceramic material in said ground powder mixture is in the range of 10–90%.

4. The method of claim 1, wherein said ground powder mixture is molded to shape by injection molding, extrusion molding or ordinary molding.

5. The method of claim 4, wherein said ground powder mixture is molded by application of a low pressure of approximately 200 kg/cm$^2$.

6. The method of claim 1, wherein a metal boride or boron carbide is added to said ground powder mixture.

7. The method of claim 1, wherein said low-temperature coke has a residual volatile content of greater than 4%.

8. The method of claim 7, wherein said low-temperature coke has a residual volatile content of 12%.

9. The method of claim 1, wherein said ground powder mixture comprises a mixture of low-temperature coke, SiC and $B_4C$.

10. The method of claim 1, wherein said ground powder mixture further contains starch as a binder.

* * * * *